US011673652B2

(12) United States Patent
Cosentino et al.

(10) Patent No.: US 11,673,652 B2
(45) Date of Patent: Jun. 13, 2023

(54) FLOW CONTROL DEVICE (71) Applicant: AIRBUS OPERATIONS LIMITED, Bristol (GB)

(72) Inventors: Enzo Cosentino, Bristol (GB); Catherine Rose Llewellyn-Jones, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/462,448

(22) Filed: Aug. 31, 2021

(65) Prior Publication Data
US 2022/0126984 A1 Apr. 28, 2022

(30) Foreign Application Priority Data

Oct. 22, 2020 (GB) ...................................... 2016757

(51) Int. Cl.
*B64C 23/00* (2006.01)
(52) U.S. Cl.
CPC ................................. *B64C 23/005* (2013.01)
(58) Field of Classification Search
CPC ........ B64C 21/02; B64C 21/08; B64C 23/005
See application file for complete search history.

(56) References Cited

U.S. PATENT DOCUMENTS

| 5,433,404 | A | * | 7/1995 | Ashill | ....................... | B64C 3/48 |
| | | | | | | 244/200 |
| 6,173,924 | B1 | * | 1/2001 | Young | ....................... | B64C 9/02 |
| | | | | | | 244/90 R |
| 6,276,641 | B1 | * | 8/2001 | Gruenewald | ............. | B64C 3/48 |
| | | | | | | 244/219 |
| 8,788,122 | B1 | | 7/2014 | Sankrithi et al. | | |

(Continued)

FOREIGN PATENT DOCUMENTS

| EP | 2 908 001 | 8/2015 |
| WO | 2016/018477 | 2/2016 |
| WO | 2019/244096 | 12/2019 |

OTHER PUBLICATIONS

Combined Search and Examination Report for GB2016757.3, dated Jul. 6, 2021, 11 pages.

(Continued)

*Primary Examiner* — Tye William Abell
(74) *Attorney, Agent, or Firm* — Nixon & Vanderhye P.C.

(57) ABSTRACT

A flow control device on a structure such that strain in the structure is at least partially transferred to the flow control device is disclosed having at least two states, or shapes, separated by an elastic instability region. The flow control device is arranged to rapidly transition, or snap through, from the first state to the second state when strain in the structure exceeds an activation threshold of the flow control device. A spoiler on an aerofoil may have a rest position where it is substantially flush with the low pressure surface and an activated position where it protrudes from the low (Continued)

pressure surface and modifies the airflow over that surface. The spoiler bends to move from the rest position to the activated position when the strain in the aerofoil crosses a threshold. The deployed spoiler reduces the lift on the aerofoil, acting to reduce the lift induced strain of the aerofoil to which the spoiler is attached.

23 Claims, 6 Drawing Sheets

(56) References Cited

U.S. PATENT DOCUMENTS

| | | | |
|---|---|---|---|
| 2006/0186269 A1* | 8/2006 | Kota | B63B 1/32 244/123.1 |
| 2008/0226448 A1* | 9/2008 | Altmikus | B64C 27/001 416/23 |
| 2011/0084174 A1* | 4/2011 | Hemmelgarn | F03D 1/0675 416/241 R |
| 2014/0291453 A1* | 10/2014 | Sankrithi | G05D 1/0066 244/199.4 |
| 2016/0229519 A1* | 8/2016 | Dilligan | B64C 9/16 |
| 2016/0369775 A1* | 12/2016 | Gonzalez | F03D 7/0296 |
| 2021/0286909 A1* | 9/2021 | Vidoli | G06F 30/10 |

OTHER PUBLICATIONS

Daynes et al., "A Morphing Trailing Edge Device for a Wind Turbine", Journal of Intelligent Material Systems and Structures, vol. 23(6), Apr. 2012, pp. 691-701.

Arena et al., "A Tailored Nonlinear Slat-Cove Filler for Airframe Noise Reduction", The American Society of Mechanical Engineers (ASME), Digital Collection, Nov. 14, 2018, pp. 1-5.

* cited by examiner

FLOW CONTROL DEVICE

CROSS RELATED APPLICATION

This application claims priority to United Kingdom Patent Application GB 2016757.3, filed Oct. 22, 2020, the entire content of which is hereby incorporated by reference.

FIELD OF THE INVENTION

The present invention relates to a flow control device arranged on a structure, an aircraft wing or wing tip device including the flow control device, a method of controlling air flow over an aerofoil, an aerofoil having a spoiler, and a method for providing a spoiler on an aerodynamic surface.

BACKGROUND OF THE INVENTION

A variety of morphing, or adaptive, structures are known which exhibit large scale shape changes, whilst maintaining load bearing capability, in response to external stimuli. Morphing structures can be especially useful in aerodynamics for flow control. Of particular interest are morphing structures that do not require active control to change shape.

Shape adaptation can exploit structural elastic instabilities. Elastic instability refers to a temporary loss of stiffness of a structure, which is restored before irreversible deformation occurs. From a primary, or fundamental, stable state a structure can be designed to reach an unstable equilibrium. From this unstable equilibrium the structure will 'snap through' to a secondary state. A post-buckled structure is 'multi-stable' if it has at least two stable equilibrium states. A 'bi-stable' structure has two stable equilibrium states and an intermediate unstable equilibrium state. From the primary stable state the structure will snap through to the secondary stable state and will remain in the secondary stable state even when the external stimulus is removed. Application of an external stimulus when in the secondary stable state can reverse the shape change back to the primary stable state with snap through. A 'mono-stable' structure can still exhibit snap through behaviour but the second state is a steady (or quasi stable) but not stable state and so the structure will return to the primary state upon removal of the external stimulus.

In morphing flow control devices thermal, electrical (e.g. piezo-electric) and aerodynamic pressure loads are known to be used as the external stimulus. For example, thermally activated flow devices on a jet engine cowling can aid in acoustic noise suppression.

It is desirable to make aircraft components as light as possible in order to improve fuel efficiency and take-off performance. In the case of aerodynamic components such as wings, there is often limited scope to reduce the weight of the wing since it must withstand significant loading as well as sudden gusts of wind e.g. during turbulence. Accordingly providing gust load alleviation can enable the weight of the wing to be reduced without impairing its ability to resist sudden gusts of wind. For gust load alleviation on an aircraft wing using a morphing flow control device actuated by the aerodynamic pressure loads, accurately predicting the magnitude of the localised loads generated by a gust can be difficult. Also, under certain manoeuvres the aerodynamic pressure loads can be similar to a gust load scenario, therefore potentially triggering unwanted snap through phenomena.

SUMMARY OF THE INVENTION

According to an aspect of the invention, there is provided a flow control device with a device aerodynamic surface arranged on a structure with a structure aerodynamic surface such that strain in the structure is at least partially transferred to the flow control device, the flow control device having a first state corresponding to a first shape of the device aerodynamic surface, and a second state corresponding to a second shape of the device aerodynamic surface, wherein the first state is a stable state of the flow control device and the second state is either a steady state or a second stable state of the flow control device, and the flow control device is arranged to rapidly transition from the first state to the second state when strain in the structure exceeds an activation threshold of the flow control device.

A flow control device is something that controls the direction of air flow over a structure. In an aircraft, this may be a vortex generator, spoiler, vane, vent, etc.

Here, rapid transition refers to the 'snap through' change from the first stable state to the second stable or steady state in a short period of time. It is a near step change between the first and second shapes of the flow control device through an intermediate unstable equilibrium state. The time period may be of the order of tenths of a second or shorter.

If the flow control device has a stable second state in addition to the first stable state then, the flow control device is multi-stable. In each stable state the flow control device may elastically deform when loaded. When the load is removed, the flow control device may elastically recover in whichever of the first or second states it has just been deformed from.

From the first stable state, the flow control device may elastically deform up to an intermediate unstable equilibrium state as strain in the structure increases up to the activation threshold. At the activation threshold the flow control device rapidly transitions to the second stable state. Reduction of strain in the structure will initially leave the flow control device in the second stable state.

A further external stimulus may be required to return the flow control device from the second stable state to the first stable state, depending on the potential energy level of the first and second states as well as the potential energy threshold between them. In some cases, once strain in the structure is low enough, airflow over the flow control device may be sufficient to return it to the first state. In others, an external stimulus could be provided by an actuator. A further alternative is that the external stimulus could be provided manually once the aircraft has landed.

Alternatively, the flow control device may be self-returning once strain in the structure is low enough. This could be provided by negative strain e.g. by the structure bending in the opposite direction to that which triggers the snap through change to the second state.

The potential energy level of the first and second states may be the same or different. The potential energy level of the first state may be lower than the potential energy level of the second state, e.g., the energy input required to reach the activation threshold from the first state towards the second state may be higher than the energy input required to reach the (reverse) activation threshold from the second state towards the first state. An external force imparted by the external stimulus on the flow control device may be dependent on operating conditions. For example, when applied to an aircraft, the airflow over the aircraft wing may apply a greater external stimulus (returning force) to the flow control device when the aircraft is at high speed than when the aircraft is at low or zero speed. Therefore, at one operating condition (e.g. low airspeed) the flow control device may behave as a multi-stable device, but at another operating condition (e.g. high airspeed) the flow control may tend not to remain in the second stable state due to the external stimulus—so behaving similarly to a mono-stable device.

If the flow control device has a steady (or quasi stable) second state in addition to the first stable state, but no second stable state, the flow control device is mono-stable. This quasi steady state may correspond to a local dip or flattening of the energy level in a potential energy/deflection plot. In the first stable state the flow control device may elastically deform when loaded. When the load is removed, the flow control device may elastically recover in the first state. From the first stable state, the flow control device may elastically deform up to an intermediate unstable equilibrium state at which the activation threshold is reached when an external stimulus is applied. At the activation threshold the flow control device rapidly transitions to the second state. Since the second state is not stable but only steady, or quasi stable, removal of the external stimulus may cause the flow control device to return to the first stable state by rapidly transitioning through the intermediate unstable equilibrium state from the second state. In the second state the flow control device may still elastically deform when loaded.

The flow control device may only change from the first stable state to the second state when sufficient strain has been transferred to the flow control device. The strain in the structure may be induced due to bending, deformation or movement of the structure and this strain in the structure will be at least partially transferred to the flow control device. When the strain in the structure local to the flow control device reaches or exceeds a threshold value, T, corresponding to the activation threshold the flow control device will change from the first state to the second state.

An advantage of using strain in the structure as the external stimulus for activation of the flow control device from the first state to the second state is that, unlike local aerodynamic loads which can be difficult to predict, deformation and associated strain levels in the structure can be accurately modelled. The flow control device can therefore be designed to be actuated at a specified strain level, unique to the structure, or part of the structure, that the flow control device will be used on. The activation from the first state to the second state using the strain can also be purely passive.

The first shape of the device aerodynamic surface may be substantially flush with the structure aerodynamic surface. In the first shape the flow control device may conform to the contours of the structure locally. In the first shape the flow control device may be integrated into the structure without any appreciable aerodynamic step between the device aerodynamic surface and the structure aerodynamic surface. This enables the airflow over structure aerodynamic surface to be uninterrupted by the flow control device.

The second shape of the flow control device may be such that it is bent away from the structure and towards an oncoming flow direction.

The device aerodynamic surface may have an aerodynamic leading edge (which may be integrated into the structure) and an aerodynamic trailing edge. The device aerodynamic surface may be adapted to curl into the second shape such that the device aerodynamic trailing edge sits away from the structure aerodynamic surface. In the second shape the device aerodynamic surface may be curved in cross section. This enables the flow control device surface to disrupt the airflow over the structure aerodynamic surface.

If the structure aerodynamic surface is an aerodynamic lifting surface, then the flow control device may act to spoil the lift of the structure aerodynamic surface when in the second shape. The act of spoiling the lift may have the effect of reducing the strain in the structure to below the activation threshold. The flow control device may be configured to return to the first stable state when the strain in the structure is reduced below the activation threshold as a result of the lift reduction. This may occur due to hysteresis of the flow control device. The flow control device may delay in returning to the first stable state until the strain in the structure reduces to a second strain threshold, or there may be a time delay after the strain is reduced below the activation threshold.

The flow control device may be configured to provide aerodynamic loads alleviation or reduction to the structure. The structure may be strained due to aerodynamic loads. When the strains in the structure reach the activation threshold the flow control device may change from the first state to the second state and in doing so may reduce the aerodynamic loads on the structure.

The activation threshold of the flow control device may be tuneable. The activation threshold may be predetermined. The activation threshold may be tuned to the strains expected or predicted to be experienced by the structure, or the part of the structure directly physically coupled to the flow control device.

The flow control device may be a panel, in particular a thin sheet or plate, preferably having three dimensional curvature.

The activation threshold may be tuned by selecting one or more of the thickness, material, shape, layup (if a laminate), fibre ply direction (if a fibre reinforced composite), prestress, etc. of the flow control device.

The flow control device may have a first activation threshold to transition from the first state to the second state. The flow control device may have a second activation threshold to transition from the second state to the first state. The first and second activation thresholds may be the same, similar or dissimilar. Where the activation thresholds are dissimilar the flow control device may exhibit significant strain activation hysteresis between the first and second states, that is to say the device may deploy at a first strain threshold and then remain deployed until the strain in the wing had dropped to a significantly lower second strain threshold.

The flow control device may be configured so that the second, steady state is maintained only by the strain in the structure remaining above the activation threshold.

The flow control device may be configured to return to the first state once the strain in the structure decreases below the activation threshold.

The flow control device maybe configured to automatically return to first stable state once the strain in the structure decreases below the activation threshold, e.g. the device is mono-stable.

Alternatively, the flow control device may be configured to at least initially remain in the second, stable state when the strain in the structure decreases below the activation threshold, e.g. the device is multi-stable.

The flow control device may not automatically return to the first stable state from the second state, even when the strain in the structure is reduced below or significantly below the activation threshold.

The flow control device aerodynamic surface may be generally rectangular in the first state, and preferably, the short side of the rectangle extends generally parallel to an oncoming flow direction.

The flow control device aerodynamic surface may generally take any shape, e.g. any regular shape or any irregular shape, when viewed in planform.

The flow control device may have a proximal end towards an oncoming flow direction, and the proximal end of the flow control device may be attached to or integrally formed with the structure. Lateral and/or distal edges (take with respect to the oncoming flow direction) of the device aerodynamic surface may be free, e.g. not directly coupled to the structure. These free edges may permit the device aerodynamic surface to bend away from the structure. The flow control device may have a distal end opposite the proximal end, wherein the distal end is unattached to the structure such that the flow control device is cantilevered from the structure by its proximal end.

The strain in the structure is at least partially transferred to the flow control device through the attached or integrally formed proximal end of the flow control device The flow control device may be retrofitted onto an existing structure, e.g. a cut out may be made into the structure aerodynamic surface to accommodate the flow control device, or could be provided on the structure and be aerodynamically blended with the aerodynamic surface of the structure. More typically, the flow control device will be designed and tuned with a new structure.

The flow control device may be attached to the structure by mechanical means, such as but not limited to, bolting, riveting and fastening. Alternatively, the flow control device may be attached by adhesive or bonding means.

Alternatively, the proximal end of the flow control device may be integrally formed with the structure. Integrally forming the flow control device with the structure may avoid any join between the structure aerodynamic surface and the device aerodynamic surface in the flow direction, and may also save weight.

The structure may comprise a composite or metallic material. Where the structure includes composite material, the composite may be a laminate and the flow control device may form part of the laminate lay-up.

Integrally forming the flow control device with the structure may reduce the manufacturing steps to create the structure/device, may save weight and may reduce parts count.

Alternatively, the structure may comprise an isotropic material, such as metal.

The flow control device may comprise anisotropic material.

The flow control device may comprise a laminate material.

The flow control device may comprise a pre-stressed isotropic material.

The isotropic flow control device may be pre-stressed by a variety of processes, e.g. bending or shot peening. The pre-stressed flow control device may be attached to the structure in a stressed condition, or may be pre-stressed separately from the structure and integrally formed with the structure. The flow control device may be pre-stressed during installation on the structure, e.g. by bending (stressing) the structure, attaching the flow control device, and then releasing the structure so it relaxes and stresses the flow control device as it relaxes.

The structure may form part of an aerofoil.

The aerofoil may be adapted to generate lift when moving relative to an air flow. In the second state the flow control device may be configured to interact with the air flow around the aerofoil to reduce the lift generated by the aerofoil as compared with the lift generated by the aerofoil when the flow control device is in the first state.

The structure aerodynamic surface may be a low pressure surface of the aerofoil. Alternatively, the structure aerodynamic surface may be a high pressure surface of the aerofoil. An aerofoil may have a respective flow control device on each of the high and low pressure surfaces.

The structure having the low pressure surface may be configured to support compressive strain when the aerofoil generates lift, and the flow control device may be configured to rapidly transition from the first state to the second state when compressive strain in the structure exceeds the activation threshold due to the lift generated by the aerofoil.

The flow control device may be a lift spoiler. The flow control device may be an aileron, a vortex generator, a vane, a vent, etc.

The structure may be on an aircraft (fixed wing, rotary wing or tilt-rotor), land vehicle, or a space vehicle (for use when in an atmosphere).

The spoiler may be arranged approximately at a quarter chord position of the aerofoil.

Alternatively, the spoiler may be arranged towards the leading edge of the aerofoil, forward of the quarter chord position, or may be arranged towards the trailing edge of the aerofoil, aft of the quarter chord position.

The flow control device on a structure may be on an aircraft wing or wing tip device. Strain in the wing/wing tip device may be caused by loading of the aircraft wing. Loading may be aerodynamic loads or other external loads. The strain may be induced by bending, deformation or movement of the structure.

The flow control device may be arranged at a transition region between the aircraft wing and an upwardly projecting portion of the wing tip device.

The transition region is the area of a wing which experiences the most up and down deflection relative to the fuselage.

In a further aspect of the invention there is a method of controlling air flow over an aerofoil having a morphing flow control device, the method comprising: operating the aerofoil to induce strain in a structure of the aerofoil; and harnessing the strain in the structure to activate a morphing flow control device arranged on the structure to rapidly transition from a first stable state to a second stable or steady state when a strain level of the flow control device exceeds a threshold due to increased strain in the structure, wherein the first state corresponds to a first shape of a device aerodynamic surface, and the second state corresponds to a second shape of the device aerodynamic surface.

The second state of the flow control device may interact with the air flow over the aerofoil to reduce the lift generated by the aerofoil as compared with the lift generated by the aerofoil when the flow control device is in the first state.

In a further aspect of the invention, an aerofoil comprises a low pressure surface with a spoiler arranged on the low pressure surface, the spoiler having a rest position where it is substantially flush with the low pressure surface and an activated position where it protrudes from the low pressure surface and modifies the airflow over that surface; wherein the spoiler is a device having a stable state in the rest position and a stable or quasi-stable state in the activated position; the spoiler bends to move from the rest position to the activated position; and the coupling of the spoiler to the aerofoil transfers at least some strain from the aerofoil to the spoiler and the movement of the spoiler is triggered by the strain in the aerofoil crossing a threshold.

In a further aspect of the invention, there is provided a method for arranging a spoiler to an aerodynamic surface by: providing an aerodynamic surface; and providing a spoiler having a first state corresponding to a first shape of the spoiler, and a second state corresponding to a second shape of the spoiler, wherein the first state is a stable state of the spoiler and the second state is either a steady state or a second stable state of the spoiler, wherein the spoiler has a proximal end towards an oncoming flow direction, and the proximal end of the spoiler is attached to or integrally formed with the aerodynamic surface, wherein the spoiler is arranged to rapidly transition from the first state to the second state when strain in the aerodynamic surface is transferred to and exceeds an activation threshold of the spoiler such that strain in the aerodynamic surface is transferred to the spoiler causing the spoiler to bend away from the aerodynamic surface.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
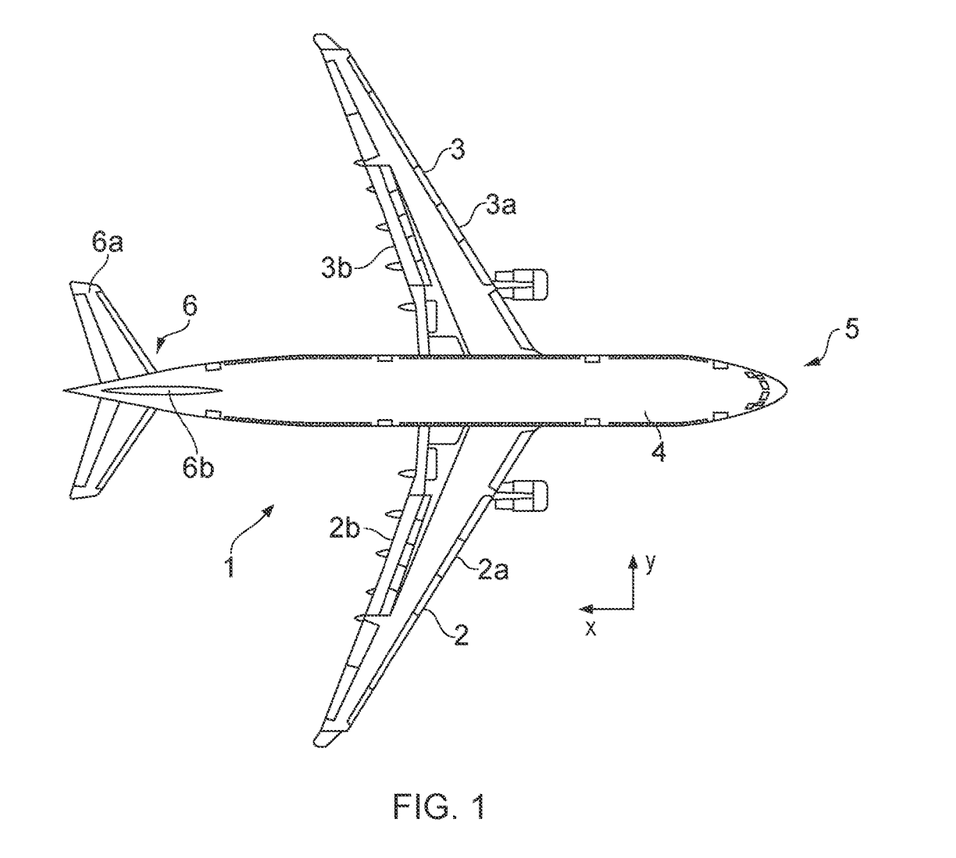
FIG. 1 is a plan view of an aircraft.

FIG. 1 shows an aircraft 1 with port and starboard fixed wings, 2, 3, a fuselage 4 with a nose end 5 and a tail end 6 including horizontal and vertical stabilising surfaces 6a, 6b. Each wing has a leading edge 2a, 3a and a trailing edge, 2b, 3b. The aircraft 1 is a typical jet passenger transonic transport aircraft but the invention is applicable to a wide variety of fixed wing aircraft types, including commercial, military, passenger, cargo, jet, propeller, general aviation etc. with any number of wings attached to the wings or fuselage. Indeed the invention can be applied a wide variety of industries requiring aerodynamic flow control, including aerospace, space, automotive, wind turbine, sailing and other industries.

Figure 2:
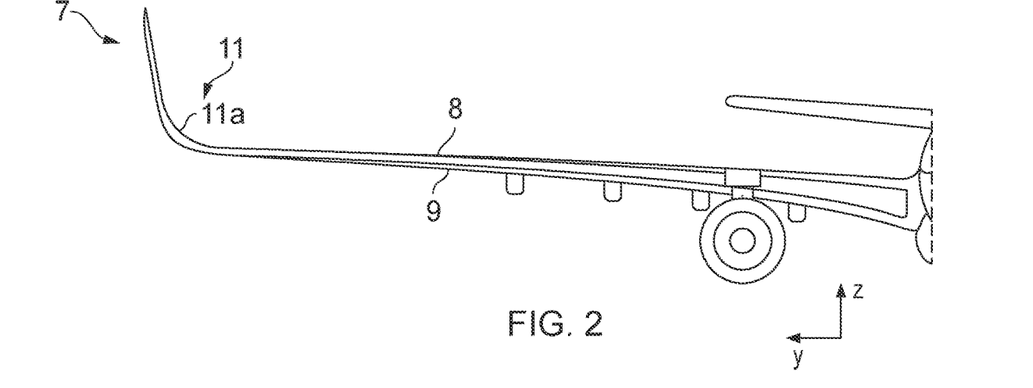
FIG. 2 shows a front view looking aft of the aircraft wing.

The axes shown in FIGS. 1 and 2 represent the usual reference orthogonal axes of the aircraft 1. The X-axis defines the longitudinal fore-aft direction of the aircraft; the Y-axis defines the spanwise direction and the Z-axis defines the vertical up-down direction of the aircraft.

Each wing 2, 3 of the aircraft has a cantilevered structure with a length extending in a spanwise direction from a root to a tip, the root being joined to the aircraft fuselage 4. The wing portion near the root is the inboard region. The wing portion near the tip is called the outboard region. The wing has an upper surface 8 and lower surface 9. At the tip end of each wing 2, 3 is a wing tip device 7 outboard of a main portion of the wing. The wing tip devices are used to reduce the induced drag of the aircraft.

Different aircraft have varying wing tip device 7 designs. Between the main portion of the wing and the wing tip device 7, there exists a transition region 11. This transition region ensures that the aerodynamic profile between the wing and the wing tip device is maintained by smooth surface blending. The wing tip device has a generally upward projecting portion. The angle (with respect to the vertical) of the generally upward projecting portion is known as the cant angle. This cant angle may vary for different wing tip devices. The upper surface of the transition region 11a is a smoothly upwardly curved surface. Alternatively, the wing may have a different wing tip device configuration, e.g. a wing tip fence, dropped wingtip, 'sharklet' or raked wingtip winglet design or other known design.

The wing has an outer aerodynamic surface. The wings 2, 3, are aft swept and have a number of aerodynamic flight control surfaces. Flight control surfaces can be adjusted during flight to adjust the aircraft flight attitude or wing performance There are a number of flight control surfaces, such as ailerons, elevator, rudders, spoilers, flaps, slats and air brakes. These are typically located on the wing 2, 3 or on the horizontal stabiliser 6a or vertical stabilisers 6b of the aircraft 1.

During flight, the wing experiences aerodynamic and inertial loading. The wing 2, 3 exhibits aeroelastic behaviour. For example, the wing flexes upwardly in the Z axis direction as the wing experiences increased aerodynamic lifting forces. The wing has an aerofoil profile with the lower wing cover experiencing higher pressure while the upper wing cover experiences lower pressure. Extreme weather conditions, such as extreme gust, also causes the wing 2, 3 to deflect and deform in the up-down direction. The upward flexure of the wing 2, 3 causes the upper cover 8 to compress, while the lower cover 9 to be under tension. As the wing tip device 7 deflects upward, the strain in the wing increases. The wing 2, 3 experiences strain due to the bending, deflection and other movement due to the external forces exerted on the wing. Flight control surfaces are may be used to limit the amount of strain experienced by the aircraft by controlling the airflow over the aerodynamic surfaces of the aircraft. For example, spoilers and ailerons may be used on an aircraft wing to reduce the lift experienced by the aircraft, so-called loads alleviation function.

Figure 3:
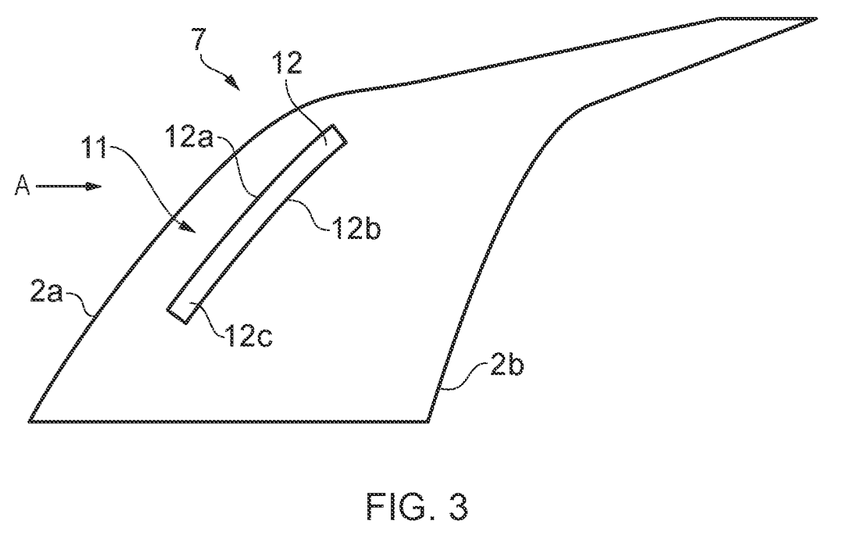
FIG. 3 shows a plan view of an outboard portion of the aircraft wing with a wing tip device and a flow control device according to a first example.

The main lift spoilers are typically found on the trailing edge of the 2b, 3b of the aircraft wings just forward of the flaps. As shown in FIG. 3, a further flow control device 12 is located on the curved wing upper surface of the transition region 11a between the wing tip and the upwardly projecting portion of the wing tip device 7. The flow control device 12 shown in FIG. 3 is configured as a lift spoiler. During upward flexure of the wing 2, e.g. during an extreme gust, the upper surface of the transition region 11a experiences relatively large deflection and deformation. Consequently, the region 11a experiences (compressive) strain.

Figure 6A:
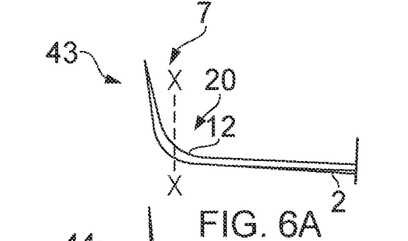
FIGS. 6A-6G show front views of the aircraft wing according to a second example bending upwardly during different load conditions with corresponding deployment of the flow control device.

Preferably, the flow control device, spoiler, 12 is located at approximately the quarter chord line of the local aerofoil profile of the aircraft wing 2, as shown in FIG. 6A. The quarter chord line, C/4, is approximately the point at which the resultant aerodynamic force acts. That is, the area where most of the lift is generated on the aerofoil. This enables the spoiler 12 to disrupt the location of maximum lift of the wing and so locating the spoiler here is most effective at reducing lift when the spoiler is deployed.

The spoiler 12 has a proximal end 12a and a distal end 12b. The proximal end 12a of the spoiler is attached to the wing 2/wing tip device 7 at the upper surface of the transition region 11a. The proximal end 12a may be attached by mechanical means, for example, bolting. Alternatively, the proximal end may be integrally formed with the aircraft wing surface. The proximal end 12a of the spoiler is towards an oncoming air flow direction, A. Distal end 12b is unattached to the aircraft wing surface, i.e. it is cantilevered. The spoiler has an upper (outer, aerodynamic) surface, 12c and a lower (inner, reverse) surface 12d (not shown in FIG. 3). In this example, the spoiler 12 is generally rectangular in planform, as shown in FIG. 3. The proximal and distal ends 12a, 12b of the spoiler 12 may have aerodynamic leading and trailing edges which are slightly curved in planform.

The first stable state 20 of the spoiler 12 is shown in FIG. 3. The shape of the spoiler 12 is substantially similar, or conformal, to the local shape of the wing 2/wing tip device 7 on which it is arranged. The upper surface 12c of the spoiler has a shape that corresponds or conforms to the local surrounding aerodynamic surface of the wing 2/wing tip device 7. The spoiler 12 is substantially flush with the aerodynamic surface of the wing 2/wing tip device 7 when in the first state. It will be understood that the spoiler 12 may be placed at any location along the length of the wing 2. Regardless of position along the wing, the upper surface 12c of spoiler 12 will have a substantially similar shape to match the aerodynamic curvature of the aerofoil portion of the structure on which the spoiler is arranged when in the first state.

As the wings 2, 3 are similar in construction, the wing 3 will have a similarly arranged flow control device for symmetry with the wing 2.

Figure 4A:
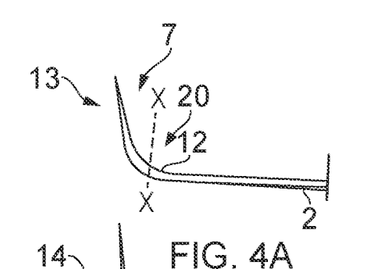
FIGS. 4A-4G show front views of the aircraft wing of the first example bending upwardly during different load conditions with corresponding deployment of the flow control device.
Figure 4B:
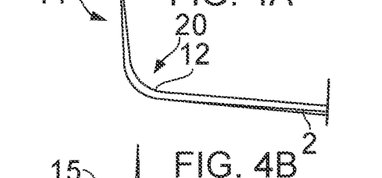
Figure 4C:
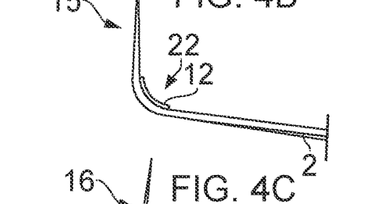
Figure 4D:
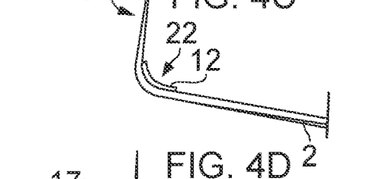
Figure 4E:
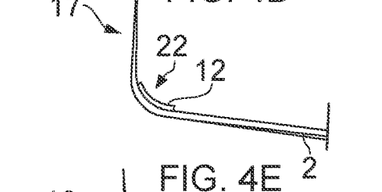
Figure 4F:
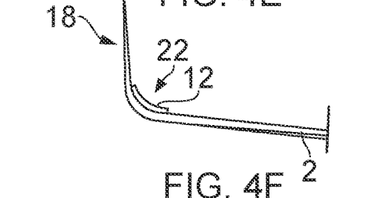
Figure 4G:
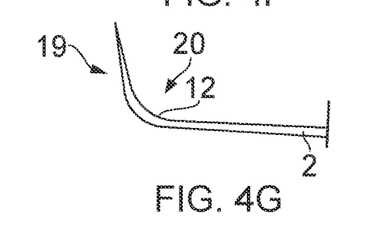

FIGS. 4A-4G show front views of an aircraft wing with a spoiler 12 in a first example. This example relates to a spoiler arranged to form a bi-stable system. FIGS. 4A to 4G show the aircraft wing at various degrees of upward deflection, e.g. in response to increasing lift generated by the wing. FIG. 4A shows the wing 2 and wing tip device 7 at an initial position 13, and FIGS. 4B through 4D show the wing moving progressively through positions 14 and 15 to a position of maximum upward deflection 16 accompanied by a corresponding reduction of (or even negative) cant angle of the upwardly projecting portion of the wing tip device 7. FIGS. 4E-4G show the wing returning back through positions 17 and 18 to the initial position 19, as the wing deflection reduces, e.g. due to reduced wing loading.

FIGS. 5A to 5G show the corresponding cross-section (through X-X of FIG. 4A) of the wing at each deflection position 13-19 shown in FIGS. 4A-4G. Each corresponding cross section has the same reference numeral, but has a 'C' after the deflection position number. For example, 13 shows the initial position of the wing, and 13C shows the corresponding cross section of the wing.

The spoiler 12 is in a first stable state 20 with a first shape in the initial position 13 of the wing as shown in FIG. 4A.

FIG. 4B shows the wing deflected upwardly by a small degree from the initial position. As the wing 2 bends and deforms, the compressive stress on the upper skin 8 of the wing increases and consequently the strain in the wing increases. The spoiler is arranged on the wing, so the strain in the wing 2 is at least partially transferred to spoiler 12. The spoiler 12 will therefore also be strained and will deflect to a small degree elastically as compared with the first shape of the spoiler in the initial position 13. If the strains in the upper surface of the wing/wing tip device are sufficiently small the spoiler will remain in the first stable state 20, i.e. the spoiler shape will elastically recover to the initial shape if the wing loading is reduced from the deflected position 14 back to the initial position 13.

FIG. 4C shows the wing deflected upwardly by a larger degree. When the strain in the wing 2 reaches an activation threshold, T, the spoiler 12 rapidly transitions from the first stable state 20 to a second stable state 22, which is best shown in FIGS. 4C, 5C and FIG. 11 or 12.

Figure 5A:
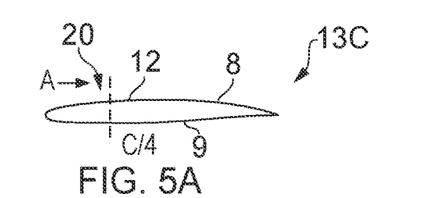
FIGS. 5A-5G show the corresponding cross sections of the aircraft wing through the flow control device relating to FIGS. 4A-4G.
Figure 5B:
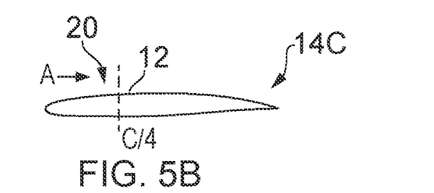
Figure 5C:
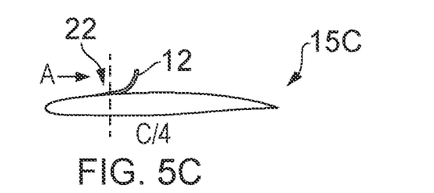
Figure 5D:
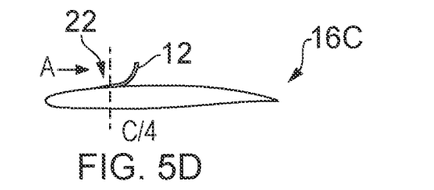
Figure 5E:
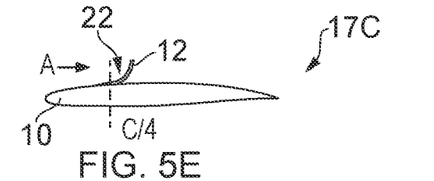
Figure 5F:
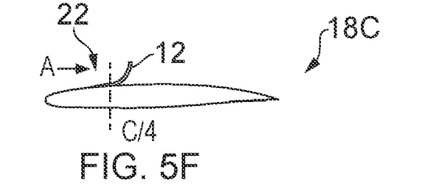
Figure 5G:
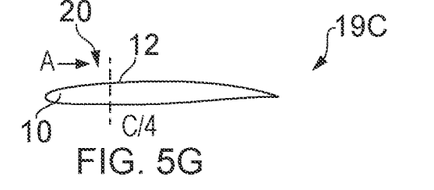

In the second stable state 22, the spoiler 12 changes to a second shape. In the second shape, the proximal end 12a of the spoiler remains substantially flush to the wing surface. The distal end 12b extends upward from the wing surface. The upper surface 12c of the spoiler curls upward. The final shape of the spoiler 12 is generally curved in shape. The spoiler is bent up and away from the wing aerodynamic surface. This allows the spoiler to disrupt the oncoming airflow, A. The upper surface 12c of the spoiler faces towards the oncoming airflow A. This alters the flow of air over the wing by spoiling the lift and decreases the lift of the local aerofoil section and hence reduces the lift in the outboard wing region of the aircraft. The decreased lift generated by the wing may allow the deflection of the wing 2 to reduce.

The wing strain activation threshold, T, may be set below that strain at the maximum wing deflection position 16 shown in FIG. 4D. The strain in the wing during maximal deflection at position 16 is greater than the strain in the wing during positions 13-15. Even when the wing strain is above the activation threshold, T, the wing loading may still increase up to the maximum wing deflection. When the spoiler is deployed to the second state, the second shape 22 of the spoiler may still deform further if the wing deflection increases up to the maximum wing deflection. Since the second state is a second stable state in the bi-stable system, the spoiler shape will tend to elastically deform and recover when in the second state.

If the wing deflection is further reduced back towards the initial position, as shown in FIGS. 4E-4F through wing deflection positions 17 and 18, the spoiler 12 will remain deployed in the active second state 22. This remains the case even if the strain reduces below the wing strain activation threshold, T, as shown in position 18, because the second state is a stable state.

The wing position 19 shown in FIG. 4G is similar to the initial position 13 of the wing and the spoiler is shown back in the first state. The spoiler 12 may remain in the second, stable, state even when the wing deflection in position 19 is reduced back to the initial position. In some circumstances this may be acceptable and a manual forced 'reset' of the flow control device may be required, e.g. when the aircraft is back on the ground after flight. Alternatively, the airflow over the wing may cause a transition back to the first state.

The spoiler 12 rapidly transitions from the first stable state 20 to the second stable state 22. Here, rapid transition refers to the 'snap through' change from the first stable state to the second stable or steady state in a short period of time. It is a near step change between the first and second shapes of the flow control device through an intermediate unstable equilibrium state.

Figure 8:
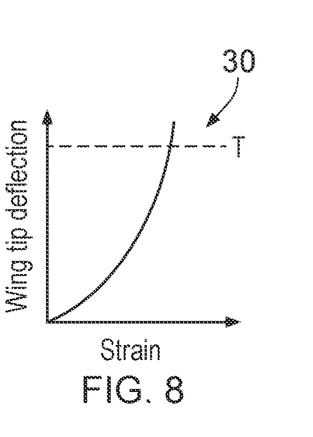
FIG. 8 shows a schematic graph relating aircraft wing tip deflection to (compressive) strain of the aircraft wing upper surface.

FIG. 8 shows a schematic graph 30 which illustrates the relationship between the wing tip deflection and strain in the wing 2. As the wing tip deflection increases, the strain in the wing increases. The broken line shows the strain activation threshold 'T' of the spoiler, 12. Once the strain in the wing exceeds the threshold T, the spoiler will rapidly transition from the first state 20 to the second state 22.

Figure 9:
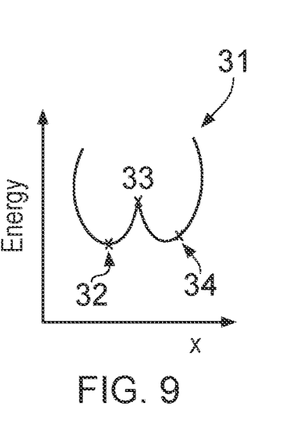
FIG. 9 shows a potential energy graph for a bi-stable system.

In the example described above with respect to FIG. 4A-4G, the spoiler is configured as a bi-stable system. The spoiler can exist in two stable equilibrium states, the first stable state 20 and the second stable state 22. FIG. 9 shows schematically the energy potential of a typical bi-stable system. When the strain transferred to the spoiler 12 is below the activation threshold, T, the spoiler remains in the first stable state 20 as the energy potential remains at the first well region 32. As the strain transferred to the spoiler approaches threshold T, the potential/activation energy approaches the unstable equilibrium at 33. At the unstable equilibrium region 33, if the strain threshold is exceeded, the bi-stable acting spoiler will rapidly transition into the second equilibrium state. The second equilibrium state is the second stable state 22 of the spoiler, and the energy potential in this state is a second well region 34. Even if the strain in the wing 2 then decreases to below the activation threshold value T, the spoiler will initially remain in the second stable state 22 absent further forces acting upon it.

The strain activation threshold T can be tuned to a specific value. The unstable equilibrium region 33 can be determined by altering the geometrical shape, size, thickness, material, material layup, pre-stress etc. of the spoiler 12 to match with the expected strains in the wing 2 to which it is to be mounted.

Figure 6B:
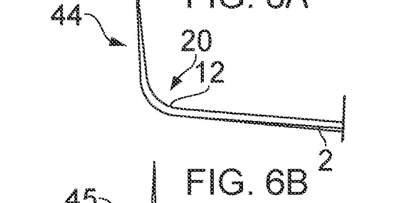
Figure 6C:
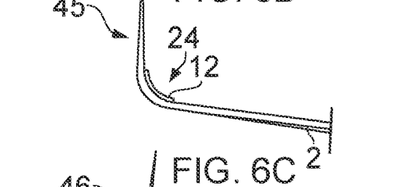
Figure 6D:
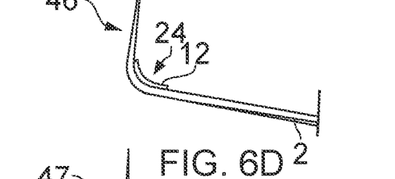
Figure 6E:
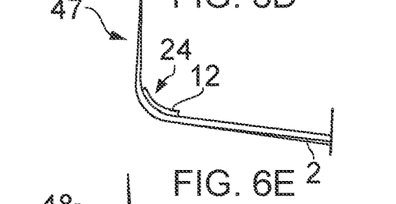
Figure 6F:
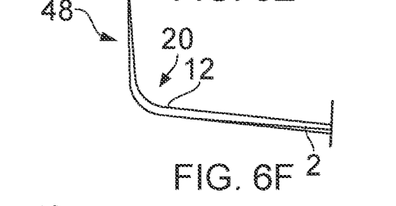
Figure 6G:
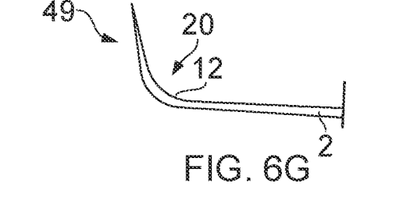

FIGS. 6A-6G show front views of an aircraft wing with a spoiler 12 in a second example. This example relates to a spoiler arranged to form a mono-stable system. Similarly to FIGS. 4A to 4G, FIGS. 6A to 6G show the aircraft wing at various degrees of upward deflection, e.g. in response to increasing lift generated by the wing. FIG. 6A shows the wing 2 and wing tip device 7 at an initial position 43, and FIGS. 6B through 6D show the wing moving progressively through positions 44 and 45 to a position of maximum upward deflection 46 accompanied by a corresponding reduction of (or even negative) cant angle of the upwardly projecting portion of the wing tip device 7. FIGS. 6E-6G show the wing returning back through positions 47 and 48 to the initial position 49, as the wing deflection reduces, e.g. due to reduced wing loading.

FIGS. 7A to 7G show the corresponding cross-section (through X-X of FIG. 6A) of the wing at each deflection position 43-49 shown in FIGS. 6A-6G. Each corresponding cross section has the same reference numeral, but has a 'C' after the deflection position number. For example, 43 shows the initial position of the wing, and 43C shows the corresponding cross section of the wing.

The spoiler 12 has substantially the same shape in the first and second states as in the previously described first example of FIGS. 4 and 5 (A-G), and so only the differences between the mono-stable and bi-stable arrangement of the spoiler will now be described. The 'snap through' rapid transition of the spoiler from the first state to the second state when the strain activation threshold 'T' is reached is the same as for the bi-stable system of the first example described above. However, in the mono-stable system of the second example, the second state 24 of the spoiler 12 is not a steady equilibrium state, but a quasi-stable or steady state that is not maintained when the strain reduces to below the strain activation threshold 'T'.

Figure 10:
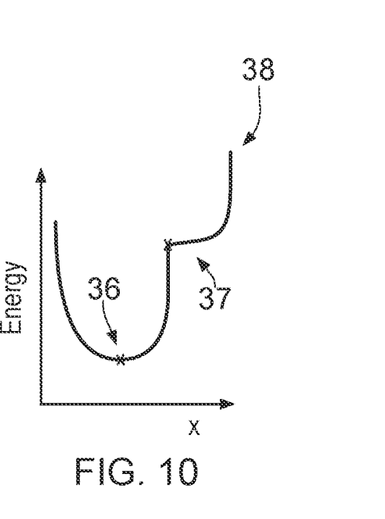
FIG. 10 shows a potential energy graph for a mono-stable system.

FIG. 10 shows schematically the energy potential of a typical mono-stable system. When the strain transferred to the spoiler 12 is below the activation threshold, T, the spoiler remains in the first stable state 20 as the energy potential remains at the first well region 36. As the strain transferred to the spoiler approaches threshold T, the potential/activation energy approaches the unstable equilibrium region 37. At the unstable equilibrium region 37, if the strain threshold is exceeded, the mono-stable acting spoiler will rapidly transition into the second equilibrium region 38. The unstable equilibrium region 7 is a sharp inflection of the energy/strain graph, but always maintaining a positive or near zero gradient.

The second equilibrium region 38 corresponds to the second, steady (or quasi-stable) state 24 of the spoiler. In this second state the spoiler 12 has a distinctly different second shape as compared with the first shape following the snap through of the elastic instability at the unstable equilibrium region 37. The spoiler 12 will revert back to the first stable state 20 (first shape) if the wing strain decreases below the threshold value, T. There may be some hysteresis but this may be small. As shown in FIG. 10, the second equilibrium region 38 always has a positive gradient, there is no second well region unlike in the bi-stable system described previously. If the wing strain remains above the threshold value T, the spoiler will remain in second steady state 24. Once the wing strain decreases to below the threshold value T, the spoiler 12 will quickly transition, or snap through, to return to the first stable state 20. The mono-stable spoiler system is inherently a passive system, as there is only a single stable state. The passive nature of the mono-stable spoiler system requires fewer parts, and no active/passive control, as compared with the bi-stable spoiler system of the first example.

Figure 7A:
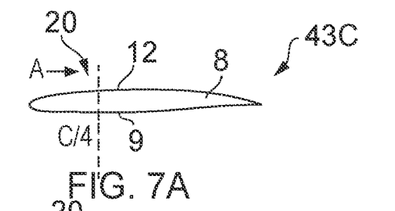
FIGS. 7A-7G show the corresponding cross sections of the aircraft wing through the flow control device relating to FIGS. 6A-6G.
Figure 7B:
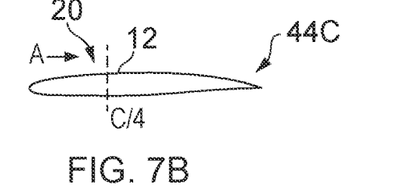
Figure 7C:
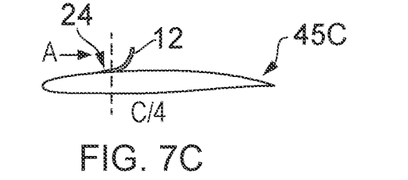
Figure 7D:
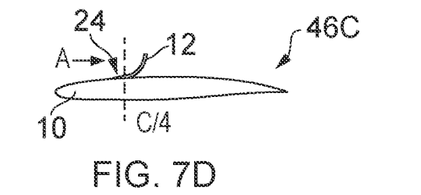
Figure 7E:
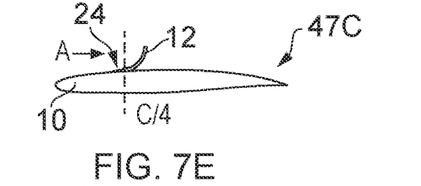
Figure 7F:
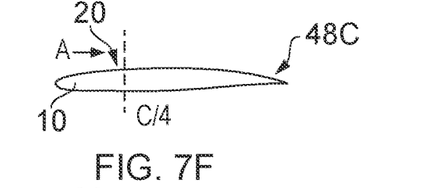
Figure 7G:
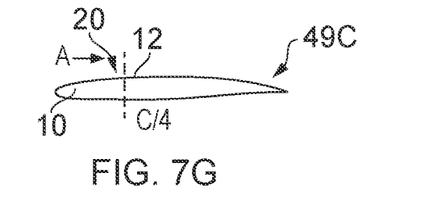

The spoiler 12 described in FIGS. 6A-6G returns to the first stable state after the strain in the wing 2 goes below the activation threshold, T. As shown in FIGS. 7A-7C, which show the corresponding cross sections of the wing, when the compressive strain in the wing decreases below the activation threshold, the spoiler 12 returns back to the first stable state 20, as shown in FIG. 6F.

Multiple spoilers 52 may be arranged on the wing tip device 7. Each spoiler is actuated independently by the wing strain local to the respective spoiler. The multiple spoilers may be tuned to deflect to the second state at the same wing strain activation threshold, or the spoilers may be tuned to deflect to the second state at different wing strains.

Figure 11:
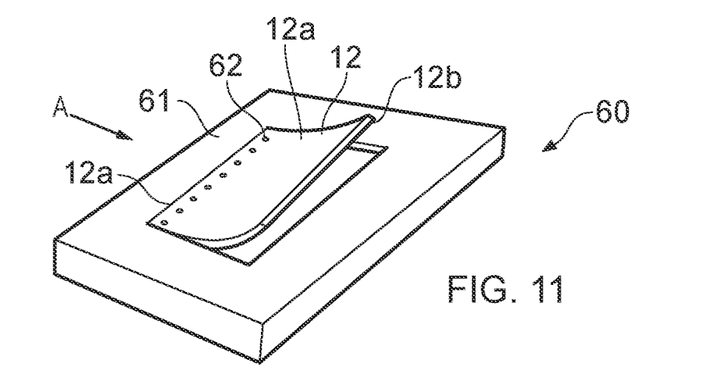
FIG. 11 shows an example of a flow control device attached to a structure.

FIG. 11 shows one way a spoiler 12, according to the previous examples may be attached to the wing 2, 3 or wing tip device 7. It will be understood that this method may also be used for spoiler 52, or any other spoiler design. The assembly 60, is an aerodynamic structure with an aerodynamic surface 61. The proximal end 12a of the spoiler is attached to the aerodynamic structure. The proximal end 12a may be attached by mechanical means, for example, by a plurality bolts, 62. It may also be attached by any other mechanical means, such as but not limited to rivets or fasteners.

Figure 12:
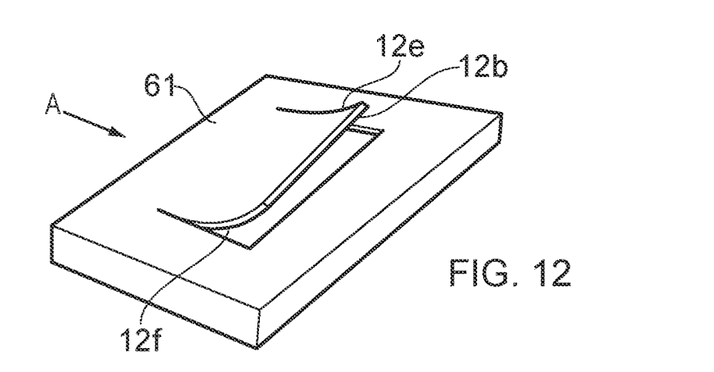
FIG. 12 shows an example of a flow control device integrally formed with a structure.

FIG. 12 shows another method of arranging the spoiler to the aerodynamic structure. The distal end 12b and corresponding edges, 12e and 12f of the spoiler are separated from the aerodynamic surface 61 during the manufacturing process, whilst the proximal end remains integrally formed with the structure. This allows the distal end 12*b* and corresponding edges of the spoiler to remain free to bend up and away as the spoiler changes state from the first state to the second state. In both FIGS. 12 and 13, the aerodynamic surface 61 may have a recess or aperture which receives the spoiler 12 in the rest state. When the spoiler is in the rest state, the upper surface 12*c* of the spoiler may be flush with the aerodynamic surface 61.

The spoiler may comprise composite material, such as fibre reinforced matrix composite, e.g. carbon fibre reinforced plastic (CFRP). To achieve the multi-stable and mono-stable properties of the spoiler, a plurality of laminate layers of composite material with varying fibre direction may be provided in the lay-up.

The multi-stable and mono-stable properties of the spoiler may be created by the use of anisotropic material. The spoiler may be a laminate component, which is made by laying up of a plurality of composite layers. The composite layers may have different orientation of the fibres in order to achieve the anisotropic behaviour properties of the spoiler in order to make it mono-stable or multi-stable.

Figure 13A:
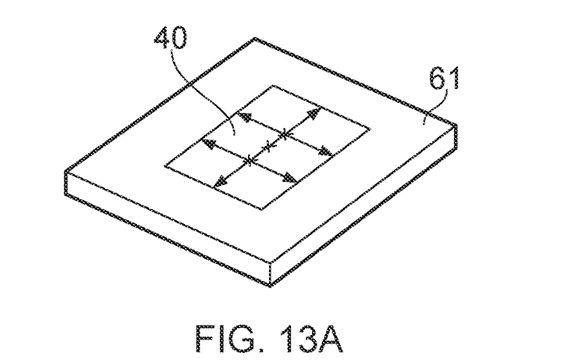
FIG. 13A shows an example of a flow control device comprising isotropic material.
Figure 13B:
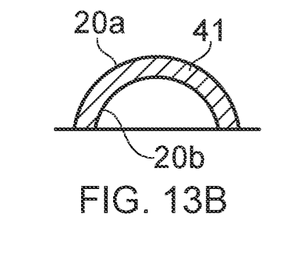
FIGS. 13B-13D show an exemplary method of pre-stressing the flow control device of FIG. 13A on a structure.
Figure 13C:
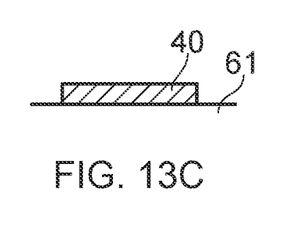
Figure 13D:
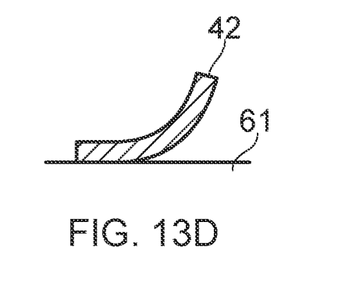

The spoiler may also be made of isotropic material. FIG. 13A shows a spoiler 12 comprising isotropic material, 40, such as, but not limited to metal. In order for an isotropic material to be mono-stable or multi-stable, it may need to be pre-stressed. FIGS. 13B-13D show an example of a flow control device being pre-stressed and installed on a structure.

The flow control device has an upper surface 20*a* and a lower surface 20*b*. Due to the pre-stressing 41 there is created a natural tendency for the flow control device 12 to curl upward in one of its states. The flow control device may then be fixed to the aerodynamic surface, when the aerodynamic structure is deformed in a direction opposite its typical deforming direction, e.g. bending an aircraft wing downwardly. By releasing the load on the deformed aerodynamic structure, the aerodynamic structure relaxes (wing deflects back up) and loads the flow control device to react against the pre-stressing, as shown in FIG. 13C, to create the first stable state of the flow control device. However, when the structure is loaded in its typical direction of deformation, e.g. wing bending upwardly, the flow control device snaps through to a second state (shape) curled upwardly 42 as shown in FIG. 13D. Pre-stressing an isotropic material may be achieved through a variety of known methods, e.g. shot peening one surface of the flow control device.

The mono-stable and multi-stable spoiler design can provide a passive loads alleviation function for an aircraft wing. The passive design reduces or may eliminate the active mechanical components, e.g. hydraulic actuators, required to traditionally actuate flow control devices. This reduces the overall weight of the aircraft and complexity of the aircraft design. Passively actuated spoilers can be used in thin aerofoil sections, such as wing tip devices, where space constraints may prohibit use of traditional actuator components. These thin aerofoil sections are typically found at the wing tips where flow control can have a large lever arm effect on the wing loading. Reduced wing bending moments at the wing root can achieve lighter construction and considerable weight savings for the overall wing design.

The aircraft wing upper aerodynamic surface spoiler examples described in detail above are designed to provide loads alleviation on an extreme wing 'up-bending' case but similar spoilers may be attached to the lower aerodynamic surface of the wing to provide loads alleviation on an extreme wing 'down-bending' case that might occur during some aileron-driven manoeuvres. In that case, the lower aerodynamic surface of the wing will exhibit compressive strain, and selecting an activation threshold of that lower surface strain can be used as the trigger for deployment of the lower surface spoiler from a first, flush shape or state to the second 'deployed' state or shape. The wing may have both these upper and lower surface spoilers.

Although this invention has been described in relation to a spoiler on an aircraft aerodynamic structure, it will be understood that this invention may be utilised for a number of different flow control devices on different aerodynamic structures which experience strain.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A flow control device with a device aerodynamic surface arranged on a structure with a structure aerodynamic surface such that strain in the structure is at least partially transferred to the flow control device, the flow control device is configured to modify the airflow and includes a first state corresponding to a first shape of the device aerodynamic surface, and a second state corresponding to a second shape of the device aerodynamic surface, wherein the first state is a stable state of the flow control device and the second state is either a steady state or a second stable state of the flow control device, and the flow control device is arranged to rapidly transition from the first state to the second state when strain in the structure exceeds an activation threshold of the flow control device, and wherein the flow control device has a first edge attached to or integrally formed with the structure and a second edge unattached to the structure.

2. The flow control device on a structure of claim 1, wherein in the first shape of the device aerodynamic surface is substantially flush with the structure aerodynamic surface.

3. The flow control device on a structure of claim 1, wherein in the second shape of the device aerodynamic surface is bent away from the structure and towards an oncoming flow direction.

4. The flow control device on a structure of claim 1, wherein the activation threshold of the flow control device is tuneable.

5. The flow control device on a structure of claim 1, wherein the flow control device is configured to at least initially remain in the second, stable state when the strain in the structure decreases below the activation threshold.

6. The flow control device on a structure of claim 1, wherein the device aerodynamic surface is substantially rectangular in the first state, preferably wherein the short side of the rectangle extends generally parallel to an oncoming flow direction.

7. The flow control device on a structure of claim 1, wherein the flow control device is mono-stable or bi-stable.

8. The flow control device on a structure of claim 1, wherein the flow control device comprises anisotropic material.

9. The flow control device on a structure of a claim 1, wherein the flow control device comprises a pre-stressed isotropic material.

10. The flow control device on a structure of claim 1, wherein the flow control device is configured such that the second, steady state is maintained only by the strain in the structure remaining above the activation threshold.

11. The flow control device on a structure of claim 10, wherein the flow control device is configured to return to the first state once the strain in the structure decreases below the activation threshold.

12. The flow control device on a structure of claim 1, wherein the flow control device has a proximal end towards an oncoming flow direction, and the proximal end of the flow control device is attached to or integrally formed with the structure.

13. The flow control device on a structure according to claim 12, wherein the strain in the structure is at least partially transferred to the flow control device through the attached or integrally formed proximal end of the flow control device.

14. The flow control device on a structure according to claim 1, wherein the structure forms part of an aerofoil.

15. The flow control device on a structure of claim 14, wherein the aerofoil is adapted to generate lift when moving relative to an air flow, and wherein in the second state the flow control device is configured to interact with the air flow around the aerofoil to reduce the lift generated by the aerofoil as compared with the lift generated by the aerofoil when the flow control device is in the first state.

16. The flow control device on a structure of claim 14, wherein the structure aerodynamic surface is a low pressure surface of the aerofoil.

17. The flow control device on a structure of claim 16, wherein the structure having the low pressure surface is configured to support compressive strain when the aerofoil generates lift, and the flow control device is configured to rapidly transition from the first state to the second state when compressive strain in the structure exceeds the activation threshold due to the lift generated by the aerofoil.

18. An aircraft wing or wing tip device comprising the flow control device on a structure of claim 15.

19. The aircraft wing of claim 18, wherein the flow control device is arranged at a transition region between the aircraft wing and an upwardly projecting portion of the wing tip device.

20. A method of controlling air flow over an aerofoil having a morphing flow control device, the method comprising:

operating the aerofoil to induce strain in a structure of the aerofoil; and harnessing the strain in the structure to activate a morphing flow control device configured to modify the airflow and arranged on the structure to rapidly transition from a first stable state to a second stable or steady state when an activation energy of the flow control device exceeds a threshold due to increased strain in the structure, wherein the first state corresponds to a first shape of a device aerodynamic surface, and the second state corresponds to a second shape of the device aerodynamic surface, and wherein the flow control device has a first edge attached to or integrally formed with the structure and a second edge unattached to the structure.

21. The method according to claim 20, wherein the strain is induced due to bending, deformation or movement of the structure.

22. The method according to claim 20, wherein in the second state the flow control device interacts with the air flow over the aerofoil to reduce the lift generated by the aerofoil as compared with the lift generated by the aerofoil when the flow control device is in the first state.

23. An aerofoil comprising a low pressure surface and a spoiler arranged on the low pressure surface, wherein the flow control device has a first edge attached to or integrally formed with the structure and a second edge unattached to the structure, the spoiler having a rest position where it is substantially flush with the low pressure surface and an activated position where it protrudes from the low pressure surface and modifies the airflow over that surface;

wherein the spoiler is a device having a stable state in the rest position and a stable or quasi-stable state in the activated position;

the spoiler bends to move from the rest position to the activated position; and the coupling of the spoiler to the aerofoil transfers at least some strain from the aerofoil to the spoiler and the movement of the spoiler is triggered by the strain in the aerofoil crossing a threshold.

* * * * *